UNITED STATES PATENT OFFICE.

FRANK X. LECHNER, OF CHICAGO, ILLINOIS.

INSECTICIDE.

No. 930,549.

Specification of Letters Patent.     Patented Aug. 10, 1909.

Application filed April 14, 1909.   Serial No. 489,830.

*To all whom it may concern:*

Be it known that I, FRANK XAVIOUR LECHNER, a citizen of the United States, residing at Chicago, in the county of Cook and State of Illinois, have invented new and useful Improvements in Insecticides, of which the following is a specification.

My composition consists of the following ingredients, combined in the proportions stated, viz:

Benzin ---------------- 1 gallon.
    Poke-root ------------- 1 ounce.
    Alum ------------------ 1 ounce.
    Red pepper ----------- 2½ ounces.

In use the composition is applied to places infected with vermin, such composition being adapted to cause practically instantaneous destruction of the latter.

The composition has been especially prepared to effect the destruction of household vermin, such as bedbugs and cockroaches, it may, however, be used with great effect upon all kinds of insects.

When applied the benzin serves as a vehicle to carry the pokeroot, alum and red pepper into cracks and crevices and then evaporates leaving said substances in the form of a crust. Besides acting as a positive poison toward insects, the smell of the pokeroot keeps them away. The proportion of pokeroot used may be varied somewhat but that given will be found to give satisfactory results.

I claim:

1. The herein described composition of matter to be used as an insecticide consisting of benzin, pokeroot, alum and red pepper.

2. The herein described composition of matter to be used as an insecticide consisting of benzin, one gallon, poke root, one ounce, alum, one ounce, and red pepper two and one-half ounces, substantially as described.

In testimony whereof I have signed my name to this specification in the presence of two subscribing witnesses.

FRANK X. LECHNER.

Witnesses:
    JOSHUA R. H. POTTS,
    JANET E. HOGAN.